Feb. 27, 1934.  A. C. LINDGREN ET AL  1,948,927
WINDROW HARVESTER
Filed Feb. 23, 1929   3 Sheets-Sheet 3

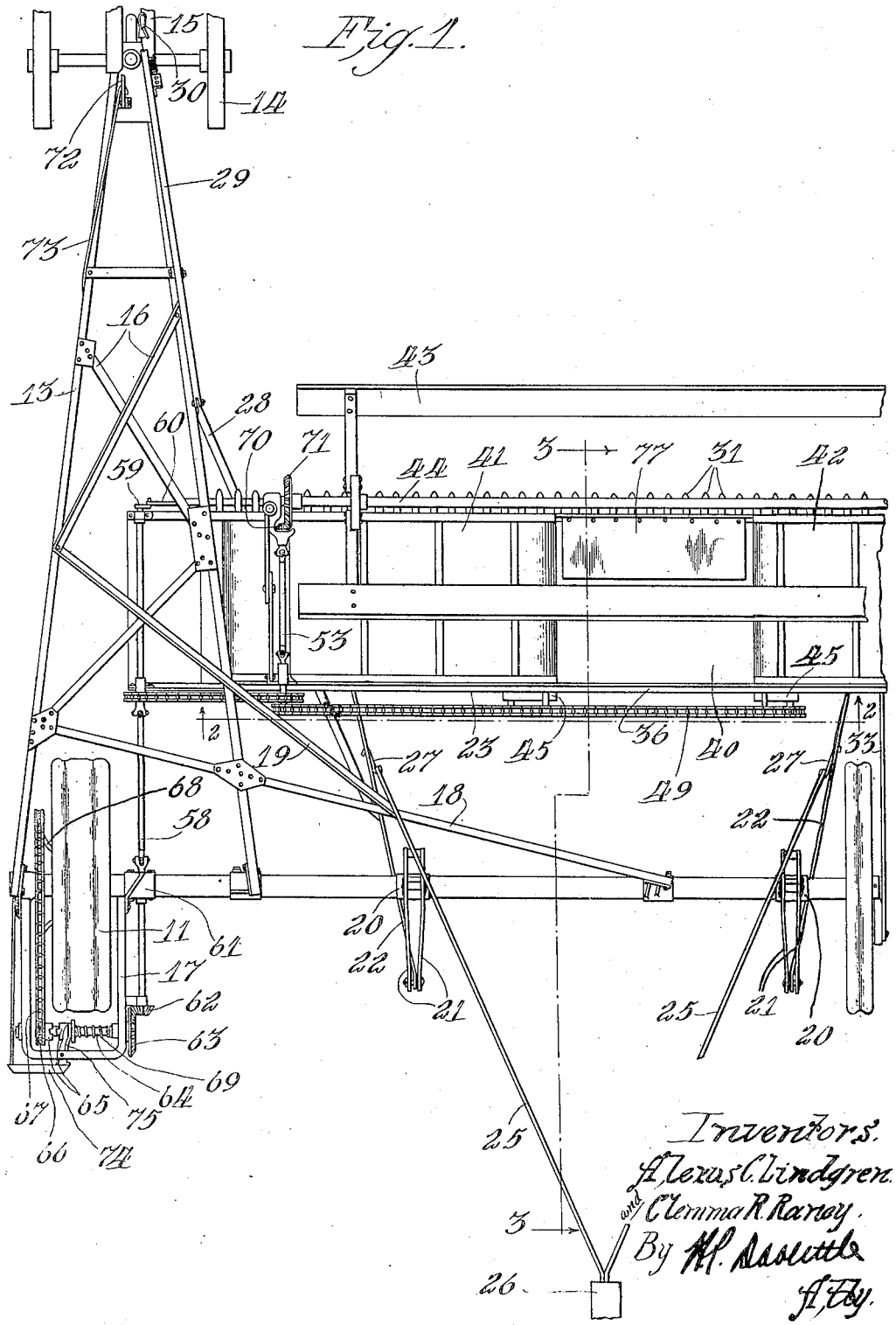

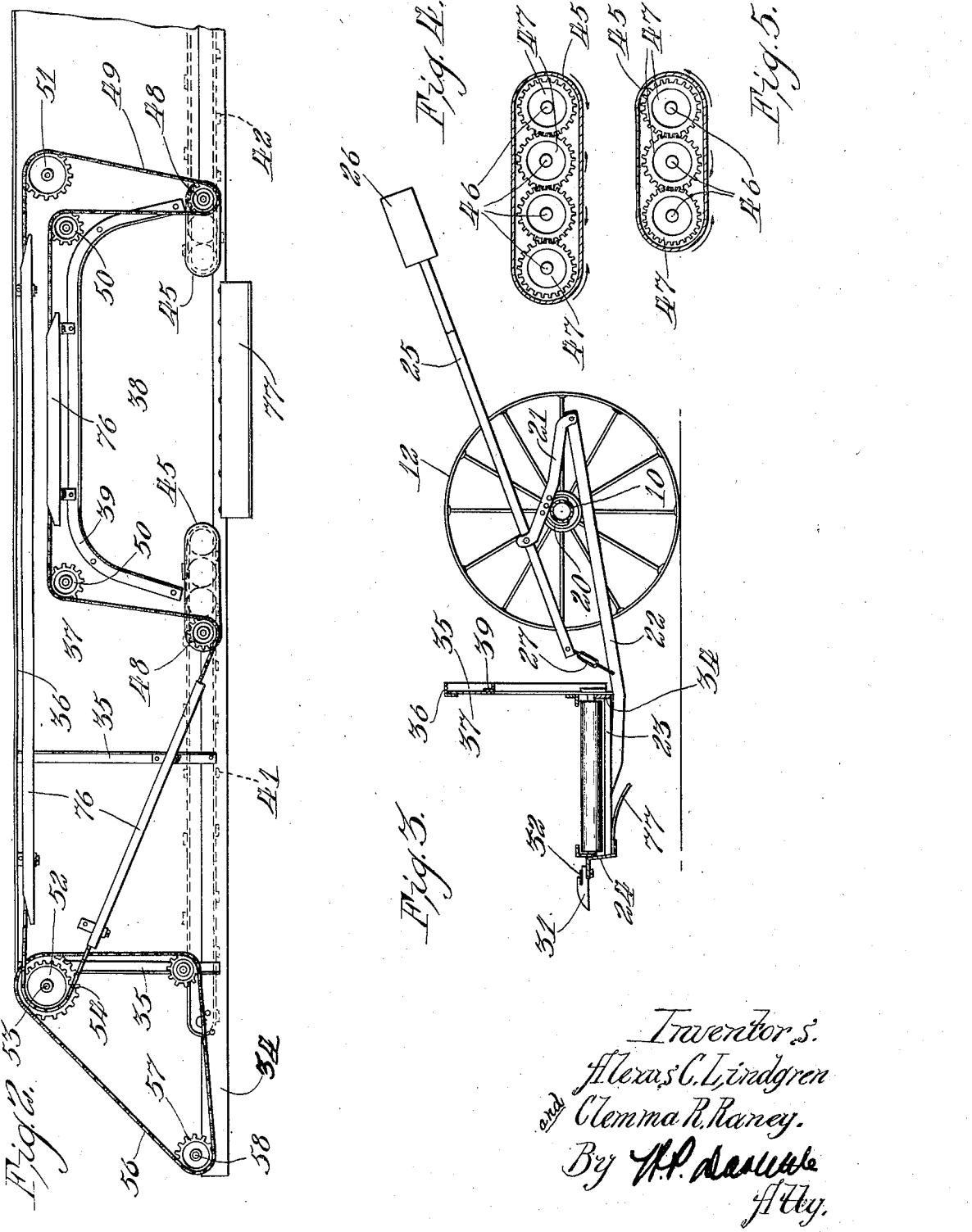

Inventors.
Alexus C. Lindgren
and Clemma R. Raney.
By H. P. Deslitth
Atty.

Patented Feb. 27, 1934

1,948,927

UNITED STATES PATENT OFFICE

1,948,927

WINDROW HARVESTER

Alexus C. Lindgren, Chicago, and Clemma R. Raney, Riverside, Ill., assignors to International Harvester Company, a corporation of New Jersey Application February 23, 1929, Serial No. 341,977
In Argentina May 29, 1928

20 Claims. (Cl. 56—23)

This invention relates to grain harvesting machinery.

Combined harvester threshers are now commonly used in harvesting operations. These machines cut the standing grain and simultaneously thresh it. The use of these machines materially reduces production costs as compared with other methods of harvesting. The user of a harvester thresher must, however, let his grain stand longer, so that it will evenly ripen, as harvester threshers cannot be employed if too much moisture is present in the grain. This condition has limited the use of harvester threshers to some extent. Because of the great saving accomplished when using harvester threshers, it is highly desirable that some way be found for permitting a wider use of these machines. This wider use of harvester threshers has been achieved through the use of old converted grain binders or headers, which go through the field while the grain is still too green to be cut by a harvester thresher, these machines cutting the grain and laying it out in windrows in the field. The grain in the windrow will, within two or three days, become properly and evenly cured, due to the action of the wind which ventilates the windrows, and also due to the drying action of the sun. After the grain in the windrow has evenly dried and the green leaves have dried out, the harvester thresher is brought into play in combination with a windrow pick-up device, which picks up the windrow and loads it onto the platform of the harvester thresher, and the operation from then on is the same as harvesting with a harvester thresher.

The purpose of windrowing the grain in this fashion is primarily to cure the same of moisture content and to dry up any green weeds present, and thus permit the earlier use of harvester threshers. As the purpose is to dry the grain evenly and to dry out green weeds mixed with the grain, it is highly desirable that the windrow formed be laid in the field in a manner best adapting it to be ventilated by wind and dried by the sun. Converted grain binders and headers do not form a good windrow as the grain becomes too mixed when the same is discharged by these machines in the field.

In windrow harvesting, satisfactory results cannot be produced if the harvester platform conveyer is to discharge the grain pell mell onto the stubble. Primarily this is so, because when the grain is planted, it is drilled in parallel rows spaced apart six or seven inches, leaving spaces between which the grain will lodge where it lies on the ground and cannot evenly dry. Therefore, the problem in proper windrowing of grain is to prevent the cut grain from being deposited on the ground between the stubble rows. This invention purposes to solve the problem by providing means for preparing the rows of stubble by bending the tops thereof over so that the bent tops of the stubble will carry and support a windrow. It is also highly important that means be provided to keep the cut grain on the platform conveyer in substantially the position which it naturally assumes thereon and further to maintain such arrangement of the cut grain when discharging the same, so that it will not mix up and be scattered.

With this preliminary statement, the present invention particularly relates to a windrowing machine and method, which will form a windrow in such a manner that said windrow will be supported by the stubble in a manner to hold the heads of the grain up where they will be exposed best to the ventilating action of the wind and the drying action of the sun and subsequently readily lend itself to the pick-up operation.

Accordingly, it is the object of this invention to provide an improved windrowing harvester including novel structural elements which cooperate to prepare the standing stubble and lay thereon an improved form of windrow which will quickly cure under the action of wind and sun and lend itself readily to the ensuing pick-up operation.

Another object is to provide a method of laying a novel form of windrow, and always on field stubble and never on standing grain, even when opening up a field.

Other objects should be apparent to those skilled in this art as the structure and use of this machine become clear from the description which ensues.

Briefly, these desirable objects are accomplished in the illustrative embodiment herein to be disclosed in the provision of a harvesting machine having a transverse axle journaled in a main wheel and a grain wheel, there being a forwardly extending A-frame connected to the stubbleward end of the axle, which A-frame is carried at its front end by a steering pilot wheel truck. The axle pivotally carries forwardly extending arms, upon which arms is carried a transverse cutting platform having a central opening and two endless conveyer aprons receiving the grain from the cutting apparatus in combination with a reel, said aprons feeding the grain to the central opening from which opening a novel structure causes the grain to be laid on the bent-over standing stubble in the improved form of windrow later to be described. A novel form of driving mechanism operated by the main wheel drives the conveyers and the reel. An adjusting mechanism is also provided for raising or lowering the platform to adjust the height of cut. The details of these features will later be described.

In the accompanying sheets of drawings there is illustrated, for purposes of this disclosure, one practicable form which this machine may assume in practice, and in which drawings,—

Figure 1 is a general plan view of the improved windrow harvester;

Figure 2 is a rear elevational view taken substantially along the line 2—2 shown in Figure 1, looking in the direction of the arrows;

Figure 3 is a central side elevational, sectional view on a reduced scale, taken substantially along the line 3—3, looking in the direction of the arrows as shown in Figure 1, the view also showing the manner of preparing the standing stubble to receive the windrow to be formed;

Figures 4 and 5 are detail views of driving gear boxes;

Figure 6:
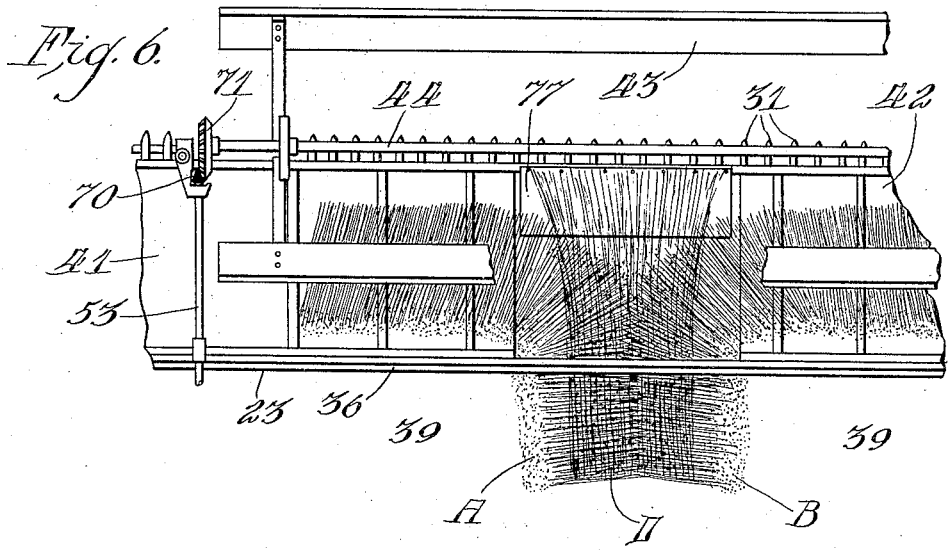
Figure 6 is a general plan view of the harvester platform to illustrate the manner of forming the windrow made by this mechanism.

The form of the improved windrowing harvester herein shown for purposes of illustration comprises a transverse axle 10 carried in a stubblewardly arranged main carrying and driving wheel 11 and in a grain wheel 12. The stubbleward end of the axle 10 rigidly carries an A-frame 13 which extends longitudinally forwardly a considerable distance, as shown, the forward end of said A-frame being carried, in any approved manner, on a steering pilot wheel truck 14. A draw element is shown at 15 whereby the machine is enabled to be pulled either by draft animals or by a tractor. Suitable cross bracing is indicated at 16 to strengthen this A-frame. The stubbleward end of the axle 10 additionally carries a U-shaped frame member 17 surrounding the back end of the main wheel 11, as shown. A transverse brace 18 also strengthens the connection between the A-frame and the axle, as shown. A brace 19 is provided for substantially the same purpose.

The axle carries two spaced brackets 20 on which are mounted above the axle two arms 21, one end of each of these arms extending upwardly and forwardly of the axle, and the rear ends thereof extending rearwardly and downwardly in a location back of the axle, as best shown in Figure 3. The rear ends of these arms 21 each have connected thereto a forwardly extending bar 22 running underneath the axle 10 and extending a considerable distance ahead, as shown in Figures 1 and 3. These bars carry at their forward ends the platform 23, at the front end of which is the usual Z-bar 24. The upper, forward ends of the arms 21 each pivotally carry a counterbalancing arm 25, which arms 25 diverge rearwardly and carry a counter-balance weight 26. The forward ends of arms 25 are connected by turnbuckle links 27 to the bars 22, as best shown in Figure 3. The turnbuckles in these links provide for relative adjustment between the counterbalancing arms 25 and the bars 22, as will be obvious. It can now be seen that the counterbalance weight 26, through the links described, helps to carry the harvester platform in a balanced position on the axle. A usual positive form of platform support is also provided in the bar 28, which runs diagonally underneath the platform and is connected to the stubbleward platform support 22, as best shown in Figure 1, the forward end of the support 28 being connected to any suitable form of connection 29 operable by a hand lever 30 for effecting up and down adjustments of the platform. It will be understood that the lever 30 can be held in locked position by any usual form of detent lock. As this structure indicated by the numerals 28, 29 and 30 is well known in the art, it has not been deemed necessary to go into greater detail in showing or describing such mechanism.

The Z-bar carries the usual guard fingers 31 and a cutting mechanism 32, which cutting mechanism extends continuously along practically the entire transverse length of the platform, it being understood that said platform extends grainwardly for quite a distance beyond the grain wheel 12. This outer grainward end of the platform has not been shown, but a support therefor connected to the axle is indicated in Figure 1 at 33. The rear end of the header platform terminates with the usual angle bar 34 which runs transversely and is rearwardly spaced in parallelism from the Z-bar 24. The angle bar, as best shown in Figures 2 and 3, carries at spaced points along its length, upright angle bars 35, the upper ends of which are connected by and carry a transverse angle bar 36. Fastened to the members 34, 35, and 36 is the usual header platform backboard 37, which protects the grain on the platform from the action of the wind, which is apt to blow the grain from the platform. Substantially centrally located between the ends of the platform, the backboard is provided with an opening 38 formed with an edging comprising an arched angle iron 39.

As has already been indicated generally in the introduction, the header platform in the described form of the invention is provided with a central opening to which oppositely running apron conveyers feed the cut and gathered grain. This opening is shown at 40 in Figure 1, there being arranged on the platform, a conventional form of endless apron conveyer 41 on the stubbleward side of the platform, which feeds the grain grainwardly to the opening 40, and, on the grainward side of the opening 40 is an oppositely running endless platform conveyer 42 which receives the cut grain and feeds it stubblewardly to the opening 40. A conventional form of reel 43 is illustrated, which is carried on a shaft 44, said reel functioning in the usual manner to bat the grain in the direction of the cutting apparatus and platform conveyers.

The angle bar 34, it will be seen, is not continuous, as it is cut away at the edge of the opening 40 in the platform. The ends of the angle bar 34 adjacent this opening each carry a closed gear box or shield 45 in which is mounted a series of stub shafts 46, (see Figures 4 and 5), each of which stub shafts carry gears 47, which gears in the respective shields or boxes are in mesh with each other, as shown. It is to be understood that the stub shaft 46 in each box 45 nearest the opening 40 carries the usual wooden driving roller of the conveyers 41 and 42. It is to be noted that the stub shafts 46 in each box 45 most remote from the opening 40 carry sprocket wheels 48 outside the boxes, and in this manner, as will later become apparent, the exposed parts of the driving mechanism are removed a substantial distance from the opening 40 in the platform and the opening 38 in the backboard, to prevent winding of the grain on the sprocket chains and gearing connection later to be described. In effect, this produces overhanging discharge ends for the conveyers 41 and 42, said discharge ends overhanging the opening 40.

The sprocket wheels 48 are driven by an endless sprocket chain 49 running in the direction indicated by the arrows, which sprocket chain is trained over two idler sprocket wheels 50 carried by the backboard at each upper side of the opening 38, and another idler sprocket wheel 51 also carried on the backboard. The chain 49 derives its motion from a sprocket wheel 52 carried on a shaft 53, which shaft 53 additionally carries a sprocket wheel 54 driven by a chain 56 from a sprocket wheel 57 on a shaft 58 arranged longitudinally at the stubbleward end of the machine. The forward end of this longitudinal shaft 58 is provided with a crank 59 which drives a pitman 60 for actuating in a well known manner, the cutting mechanism indicated in Figure 3 by the numeral 32. The back end of the shaft 58 runs through a bearing 61 carried on the axle 10 of the machine, said shaft 58 being provided with a bevel pinion 62 in mesh with a bevel gear 63 on a transverse shaft 64 carried in the U-frame 17 heretofore mentioned. The shaft 64 is a normally stationary shaft adapted to be connected by means of a clutch 65 to be driven from a sprocket wheel 66 connected by a chain 67 to a driving sprocket wheel 68 connected in any suitable manner to the main wheel 11, so that the sprocket wheel 68 turns with the wheel 11 as the machine advances over the ground. It can now be seen that a spring 69 encircling the shaft 64 normally acts to close the clutch 65 in a manner to permit the chain 67 to drive the shaft 64 and, as a result, drive all of the mechanism which operates the cutting apparatus and the platform conveyers 41 and 42.

The shaft 53 heretofore mentioned extends forwardly where it carries a bevel gear 70 in mesh with a bevel pinion 71 on the reel shaft 44. In this manner the reel shaft is driven to rotate the reel.

The clutch 65 is controlled from the front end of the machine by means of a lever 72 which operates a link 73 for pulling on a bar 74 pivotally connected to the U-frame 17 in such a manner that another part in the nature of a bell crank arm 75 can actuate one of the clutch parts, as is well known in this art.

Suitable guide runners 76 are provided on the backboard 37 to carry the long runs of the chain 49.

In the opening 40 of the platform is arranged a sloped retarder board or plate 77, which is secured to the Z-bar in a manner to cause said board to extend rearwardly and downwardly a short distance into the opening 40. It is to be noted that the upper or high end of this plate lies in substantially the same horizontal plane with the discharge ends of the conveyers 41 and 42. This board cooperates to lay the windrow on the ground, in a manner to be described.

The operation of the improved windrowing harvester will now be described. The machine is pulled by any suitable draft power, and, as the machine advances with the clutch 65 held in its in position by the spring 69, the shaft 58 will be driven in the manner described, and, through the connections also heretofore mentioned, the cutting mechanism and reel are caused to be driven. Similarly, the endless apron conveyers 41 and 42 are caused to be driven in opposite directions, as the gears 47 in the gear boxes 45 cause the driven rollers of these conveyers to turn in opposite directions. Due to the peculiar construction described, the discharge ends of the conveyers 41 and 42 overhang the opening 40 in a manner to cause the grain to be discharged into said opening and at a point remote from the exposed runs of the driving chain 49 and also the sprocket wheels 48. This set back arrangement for the driving parts and especially the posts or angle bar 39 is shown in Figure 6, where it will be seen that the grain can make an uninterrupted turn without catching and winding the grain, which would otherwise bunch adjacent the opening 40 and particularly adjacent the edges of the opening 38 in the backboard 37. Looking to Figure 6, it will be seen that the grain, as it is cut, is batted back onto the conveyers with the butt ends lying on the front end of the conveyers and the head ends of the grain lying at the back end of the conveyers. All the while, these conveyers are moving rapidly toward the opening 40.

Figure 7:
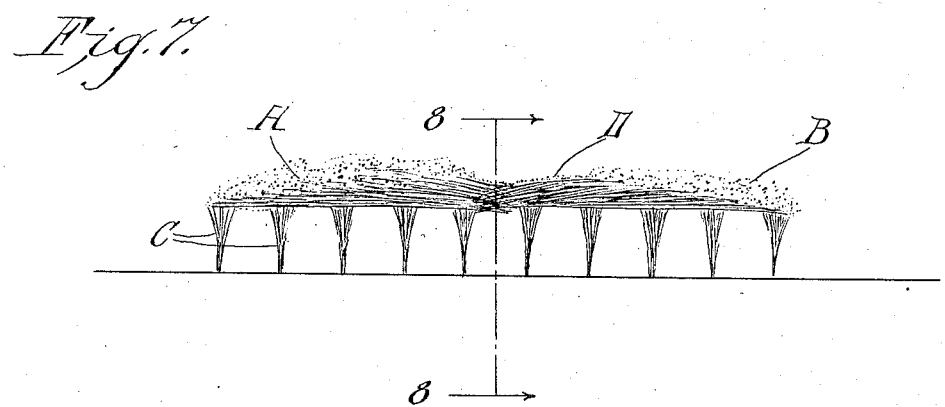
Figure 7 is a general end view of the improved windrow.
Figure 8:
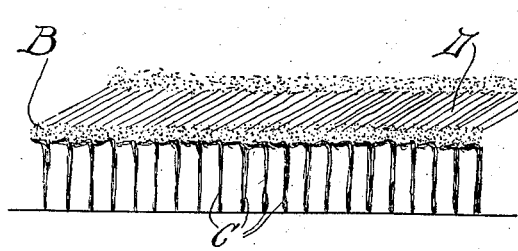
Figure 8 is a general, vertical, side sectional view through the center of the windrow, as seen along the line 8—8 of Figure 7, looking in the direction of the arrows.

It is a well known fact that the head ends of the grain, when moving on conveyers of this type, usually lag behind the butt ends, because the butts are closest to the conveyer and have had imparted thereto the movement of the conveyer before the heads strike the conveyer. This causes the straws of grain to move in the slightly oblique position shown in Figure 6. This lagging action of the head ends of the grain causes the butts to approach the opening 40 slightly before the head ends. Thus, the butt ends will strike the plate or pan 77 and slide down into the stubble standing in the field, which stubble then, as the machine advances, acts to pull the grain, head end first, from the plate or pan 77 in such a manner that the head ends will be out and the butt ends in along the center on top of the bent-over stubble, very much as shown in Figures 7 and 8, the grain assuming a slightly slanted, shingle formation, as shown in Figure 6, due to the forward travel of the machine. The two grain streams discharged from the oppositely running conveyers meet, of course, and in so doing spend their inertia of momentum. Further, the force of discharge of the grain is caused to be retarded or spent by the plate 77, thereby substantially maintaining the grain against a forceful discharge and consequent objectionable mixing and scattering. The pan also, obviously, prepares the stubble to receive the windrow by deflecting the stubble down and ahead, and maintaining the stubble in such bent-over position while the windrow is being laid and formed thereon, and subsequently the weight of the windrow keeps the stubble bent as has been described to form a very effective windrow support, with the grain above the ground where it will evenly dry. Weeds, of course, will also dry out. If it were not for the pan, the grain would be scattered by the standing stubble through a width as wide as said opening 40. Thus, the plate performs a very important function in causing the windrow to be laid in an advantageous formation by the method of this invention. This is so because the plate is interposed between the point of discharge of the grain from the conveyers and the stubble, where it holds the field stubble bent over and prevents the discharged grain from being deposited between the rows of stubble. As the meeting streams of grain have spent their inertia in meeting, the grain naturally falls onto said stubble in a quiescent state. Thus, the plate receives the grain and retards it further, so that it will not too fast engage the field stubble. From the plate, the grain then falls and is dragged by the stubble into the formation of the window. As the heads are uppermost, naturally they will be off the ground and, as a result, they will be properly ventilated by the action of the wind and effectively dried by the action of the sun. Such effective curing of the grain could not be achieved, if the head ends were thrown pell-mell onto the ground or onto the stubble with most of the heads downmost, as would be the result when using old converted binders and headers mentioned in the introduction to this specification. Another factor must be considered, however, in this connection of properly laying the windrow. That is, that the cutting apparatus is working in front of the opening 40 also to cut the grain, which grain is batted back by the reel onto the plate 77 and, due to the pressure from the butt ends of the grain coming off the discharge ends of the conveyers 41 and 42, this cut of grain from in front of the opening 40 is caused to be arranged into a somewhat constricted stream, as shown in Figure 6, and, as a result, it is piled, shingle fashion, upon the butts and between the heads of grain which came from the conveyers.

Thus, the mechanism described lays a windrow of the formation shown in Figures 6, 7 and 8, in which two rows of grain are laid with butts adjoining in the center of the windrow, and the heads in each row located along each side remote from the middle. Further, the straws are slightly slanted and disposed with butts forming the apex of an angle, as shown. Due to the movement of the machine, a shingling formation results with the heads out and the butts in. The row of grain from the conveyer 41 is shown at A, and the opposed row of grain from the conveyer 42 is shown at B. The standing bent-over stubble upon which the grain is laid and supported is indicated by C. The middle cut of grain from in front of the platform opening 40 is laid back, head end first, in shingled layers at D between the rows A and B, as shown, said grain D resting on top of the butts of rows A—B. The enlarged opening 38 in the backboard provides the necessary clearance for passage of the machine over the windrow in formation without interfering in any way therewith.

If it is desired to make up and down adjustments of the platform to vary the height of cut, the operator adjusts the lever 30, which pulls up or pushes down on the platform through the links 29 and 28, as will be readily understood, and in this action the weight of the platform is counterbalanced by the weight 26, thereby making these adjustments of the platform easy, as is common in harvesting machinery.

The improved method of harvesting grain and laying it in a windrow, therefore, comprises the steps of laying two rows of cut stalks in a windrow with the stalks in opposed rows having their butts meet at a slight angle along the center of the windrow, and with the heads in the opposed rows laid shingle fashion above and on top of the standing bent-over stubble along the sides of the windrow. A further step contemplates laying the grain from in front of the opening 40 in a somewhat constricted stream substantially flatly and in shingle fashion on top of the windrow between the rows of heads at each side thereof. An obvious advantage of arranging the discharge opening for the grain rearwardly of the sickle is that at no time, even when opening up a field, is it necessary to form the windrow on any standing grain. The windrow can only be formed on the standing stubble.

From this detailed description, it can now be appreciated that a novel form of windrow harvester has been provided which achieves the objects heretofore recited. It is to be understood that only an illustrative embodiment of the invention has been shown and that obviously the same may take other forms and be susceptible of a rearrangement of parts without departing from the spirit and scope of this invention as is indicated in the following claims.

What is claimed as new is:

1. In a windrow harvester, a platform carried on a front Z-bar and a rear angle bar, said platform having a discharge opening therein intermediate its ends, said Z-bar being continuous and carrying cutting apparatus, said angle bar being broken away at the rear of the opening, conveyers on the platform running in the direction of said opening, and a plate carried by the Z-bar to extend rearwardly and downwardly into the opening.

2. In a windrow harvester, a platform including cutting apparatus and having a discharge opening intermediate its ends, oppositely running conveyers for receiving the cut material and for delivering it to said opening, and a backboard for the platform, said backboard having an opening therein adjacent the platform opening.

3. In a windrow harvester, a platform including cutting apparatus and having a discharge opening intermediate its ends, oppositely running conveyers for receiving the cut material and for delivering it to said opening, a rearwardly extending plate carried by the platform to extend into said opening, and a backboard for the platform, said backboard having an arched passageway therein adjacent the platform opening.

4. In a windrow harvester, a platform carried on a front Z-bar and a rear angle bar, said platform having a discharge opening therein intermediate its ends, said Z-bar being continuous and carrying cutting apparatus, said angle bar being broken away at the rear of the opening, conveyers on the platform running in the direction of said opening, a plate carried by the Z-bar to extend rearwardly and downwardly into the opening, and a backboard carried on the rear angle bar, said backboard being formed with a passageway adjacent the opening in the platform.

5. In a windrow harvester, a platform having an opening intermediate its ends, conveyers on the platform feeding to said opening, and a backboard for the platform also provided with an opening adjacent the aforementioned opening, the discharge ends of the conveyers protruding inwardly beyond the sides of the backboard opening.

6. In a windrow harvester, a platform having an opening intermediate its ends, conveyers on the platform feeding to said opening, a plate on the platform projected into the platform opening, and a backboard for the platform also provided with an opening adjacent the aforementioned opening, the discharge ends of the conveyers protruding inwardly beyond the sides of the backboard opening.

7. In a windrow harvester, a platform having cutting apparatus and an opening intermediate its ends, conveyers on the platform feeding to the platform opening, a reel for the platform, a backboard for the platform having a passage-way adjacent the platform opening, a plate on the platform extending into the platform opening, and means for driving the cutting apparatus, reel and conveyers.

8. In a windrow harvester, a platform having an opening intermediate its ends, conveyers on the platform on opposite sides of said opening, a backboard for the platform, said backboard having a passage-way therein adjacent the platform opening, and driven connections carried on the backboard for driving said conveyers.

9. In a windrow harvester, a platform including an angle bar, said platform having an opening intermediate its ends, the angle bar being broken away adjacent said opening, a backboard for the platform carried on said bar, the backboard having a passage-way therein adjacent the platform opening, conveyers on the platform, and driven connections carried by the bar and backboard for driving the conveyers in a direction to feed to the platform opening.

10. In a windrow harvester, a platform including an angle bar, said platform having an opening intermediate its ends, the angle bar being broken away adjacent said opening, a backboard for the platform carried on said bar, the backboard having a passage-way therein adjacent the platform opening, conveyers on the platform, gear boxes including gearing on the bar for driving the conveyers in a direction to feed to the platform opening, said boxes also including sprocket wheels, and driven chain connections carried on the backboard and arched over the passage-way therein for driving said sprocket wheels to operate the gearing and conveyers.

11. In a windrow harvester, a platform including an angle bar, said platform having an opening intermediate its ends, the angle bar being broken away adjacent said opening, a backboard for the platform carried on said bar, the backboard having a passage-way therein adjacent the platform opening, conveyers on the platform, said conveyers having their discharge ends projecting into the platform opening and inwardly of the side edges of the backboard passage-way, gear boxes including gearing carried on the angle bar for driving the conveyers, and driven connections carried on the backboard including a chain and sprocket wheels set back from the sides of the backboard passage-way.

12. In a windrow harvester, a platform having a substantially central discharge opening, a backboard for the platform having a substantially central arched passageway adjacent the platform opening, a deflector plate arranged in the front part of the platform opening, conveyers on the platform feeding to the platform opening and projected inside of the backboard passage-way, and driving connections for the conveyers, said connections being carried on the backboard and located away from the passageway to prevent said connections from winding grain coming through the said passage-way.

13. In a windrow harvester, a transverse wheel carried axle, a forwardly extending main frame rigidly mounted on the axle and having a front support, platform supporting bars pivotally hung from the axle and extending forwardly thereof, a platform carried at the forward ends of said bars and spaced forwardly of said axle, said platform having a discharge opening therein intermediately of its ends, and conveyers on the platform feeding to said opening.

14. In a windrow harvester, a transverse wheel carried axle, a forwardly extending main frame rigidly mounted on the axle on the stubbleward end thereof and having a front support, an offset header platform pivotally carried on the axle adjacent the main frame, said platform having a substantially central discharge opening, a conveyer on each side of the opening on the platform for feeding to said opening, and a deflector plate in said opening carried by the platform.

15. In a windrow harvester, a transverse wheel carried axle, a forwardly extending main frame mounted rigidly on the axle and having a front support, a platform pivotally carried on the axle adjacent the main frame and having an opening therein intermediate its ends, a backboard for the platform having a passage-way intermediate its ends adjacent the platform opening, and a conveyer on the platform at each side of the opening to feed material to said opening.

16. In a windrow harvester, a transverse wheel carried axle, a forwardly extending main frame mounted rigidly on the axle and having a front support, a platform pivotally carried on the axle and offset relative to the main frame, said platform having a substantially central discharge opening, a conveyer on each side of the opening on the platform for feeding to said opening, a deflector plate in said opening, and a backboard on the platform having a passage-way adjacent the platform opening.

17. In a windrow harvester, a transverse wheel carried axle, a forwardly extending main frame rigidly carried on the stubbleward end of the axle, a platform pivotally mounted on the axle and offset relative to the main frame, a cutting mechanism for the platform, a reel, said platform having a discharge opening intermediate its ends, conveyers on the platform arranged on each side of the opening, a backboard for the platform having a passage-way adjacent the platform opening, and means for driving the cutting mechanism, reel and conveyers.

18. In a windrow harvester, a transverse wheel carried axle, a forwardly extending main frame rigidly carried on the stubbleward end of the axle, a platform pivotally mounted on the axle and offset relative to the main frame, a cutting mechanism for the platform, a reel, said platform having a discharge opening intermediate its ends, conveyers on the platform arranged on each side of the opening, a deflector plate in the opening, a backboard for the platform having a passage-way adjacent the platform opening, and means for driving the reel, cutting mechanism and conveyers from one of the carrying wheels.

19. In a windrow harvester, a transverse wheel carried axle, a forwardly extending main frame mounted rigidly on the axle and having a front support, a platform pivotally carried on the axle adjacent the main frame and having an opening therein intermediate its ends, a backboard on the platform having a passage-way therein adjacent the platform opening, means on the main frame for adjusting the platform up or down, and a counter-balance for the platform.

20. In a harvester, means for cutting grain, means for receiving and conveying cut grain to a point of discharge, and a backboard for the receiving and conveying means, said backboard having its end adjacent the discharge end set back to cause the receiving and conveying means to protrude laterally of said backboard edge.

ALEXUS C. LINDGREN.
CLEMMA R. RANEY.